United States Patent
Lee et al.

(10) Patent No.: US 6,680,769 B1
(45) Date of Patent: Jan. 20, 2004

(54) MULTI-DOMAIN LIQUID CRYSTAL DISPLAY DEVICE

(75) Inventors: Yun Bok Lee, Kunpo-shi (KR); Doo Hyun Ko, Kumi-shi (KR); Joun Ho Lee, Daeku-kwangyokshi (KR)

(73) Assignee: LG.Philips LCD Co., Ltd. (KR)

( * ) Notice: Subject to any disclaimer, the term of this patent is extended or adjusted under 35 U.S.C. 154(b) by 0 days.

(21) Appl. No.: 09/497,507

(22) Filed: Feb. 4, 2000

(30) Foreign Application Priority Data

Feb. 8, 1999 (KR) .......................................... 1999-4195
Apr. 22, 1999 (KR) ......................................... 1999-14492

(51) Int. Cl.[7] ...................... G02F 1/1377; G02F 1/1343
(52) U.S. Cl. .......................... 349/129; 349/38; 349/143
(58) Field of Search .............................. 349/129, 123, 349/38, 42, 43, 84, 110, 143, 139

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |
| 4,973,135 A | 11/1990 | Okada et al. | 350/334 |
| 4,978,203 A | 12/1990 | Yamazaki et al. | 350/339 R |
| 5,249,070 A | 9/1993 | Takano | 359/54 |
| 5,479,282 A | 12/1995 | Toko et al. | 359/75 |
| 5,574,582 A | 11/1996 | Takeda et al. | 359/59 |
| 5,623,354 A | 4/1997 | Lien et al. | 349/124 |
| 5,668,650 A | 9/1997 | Mori et al. | 349/42 |
| 5,737,051 A | 4/1998 | Kondo et al. | 349/141 |
| 5,777,701 A | 7/1998 | Zhang | 349/44 |
| 6,356,335 B1 * | 3/2002 | Kim et al. | 349/156 |

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 1/1999 |
| JP | 1028622 | 1/1989 |
| JP | 05-297412 | 11/1993 |
| JP | 09-197420 | 7/1997 |
| JP | 09-230387 | 9/1997 |
| WO | 961 0774 | 4/1996 |

OTHER PUBLICATIONS

A. Lien, R.A. John, Two–Domain TN–LCDs Fabricated by Parallel Fringe Field Method, SID Digest, 1993, pp. 269–272.

(List continued on next page.)

Primary Examiner—Robert H. Kim
Assistant Examiner—Thoi V. Duong
(74) Attorney, Agent, or Firm—McKenna Long & Aldridge LLP

(57) ABSTRACT

A multi-domain liquid crystal display device includes first and second substrates facing each other and a liquid crystal layer between the first and second substrates. A conductive layer distorting electric field is on the first substrate, and a common-auxiliary electrode is on a same layer whereon the conductive layer distorting electric field is formed. A common electrode is on the second substrate, and a storage electrode is in an electric field inducing region that divides the liquid crystal layer into at least two domains.

37 Claims, 29 Drawing Sheets

OTHER PUBLICATIONS

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

* cited by examiner

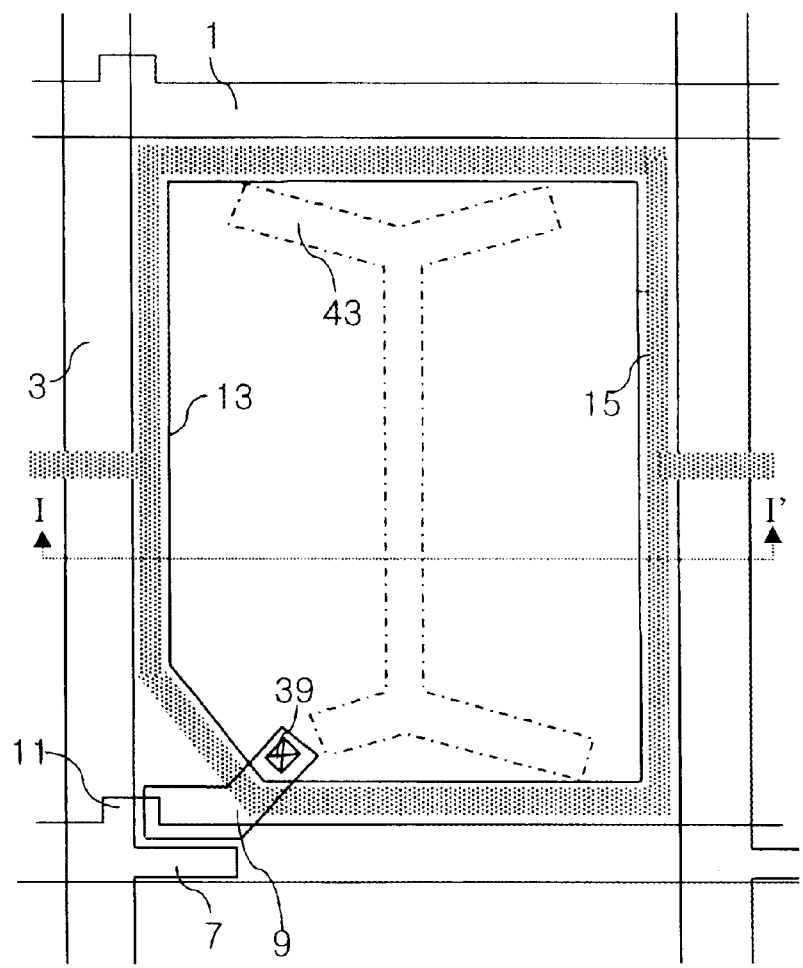

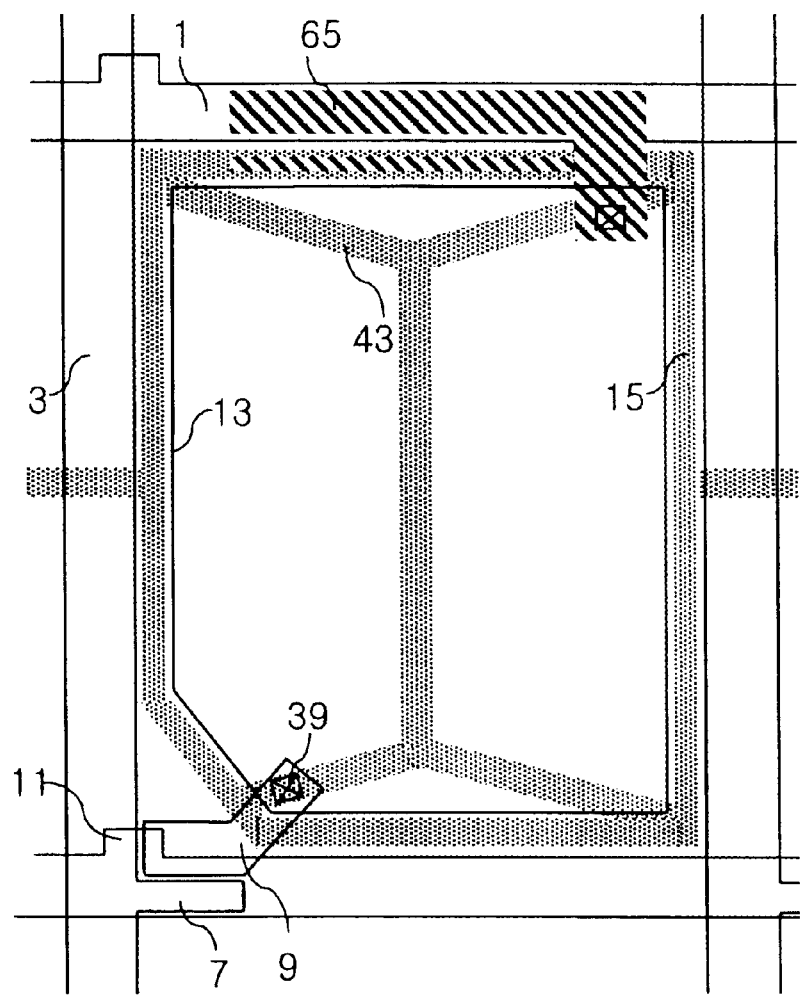

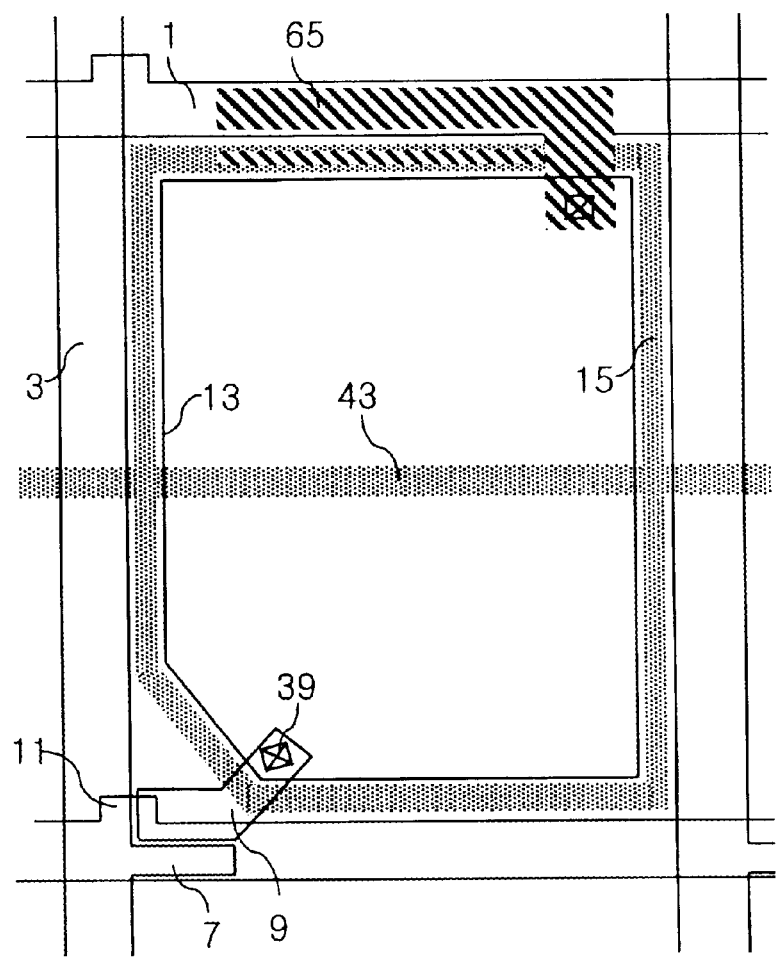

MULTI-DOMAIN LIQUID CRYSTAL DISPLAY DEVICE

BACKGROUND OF THE INVENTION

1. Field of the Invention

The present invention relates to a liquid crystal display device (LCD), and more particularly, to a liquid crystal display device having common-auxiliary electrodes surrounding pixel region and storage electrode in the pixel region.

2. Description of the Related Art

Recently, an LCD has been proposed where the liquid crystal is not aligned and the liquid crystal is driven by side electrodes insulated from pixel electrodes. FIGS. 1a and 1b are sectional views of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions.

A thin film transistor (TFT) applies image signal delivered from the data bus line to a pixel electrode 13 on a passivation layer 37. The TFT is formed on each pixel region and comprises a gate electrode, a gate insulator, a semiconductor layer, a source electrode, and a drain electrode, etc.

Pixel electrode 13 is formed on the gate insulator, thereon passivation layer 37 is formed over the whole first substrate, and side electrode 21 is formed surrounding the pixel electrode 13 and a part of pixel electrode 13 overlaps side electrode 21. (FIG. 1A)

Alternatively, pixel electrode 13 is formed on the gate insulator, and passivation layer 37 is formed over the whole first substrate.

On second substrate, a light shielding layer is formed to shield any light leakage from gate and data bus lines, and the TFT, a color filter layer is formed on the light shielding layer, an over coat layer is formed on the color filter layer, a common electrode 17 is formed to have open area 27 on the over coat layer, and a liquid crystal layer is formed between the first and second substrates.

The common electrode 17 is formed and applies electric field to a liquid crystal layer together with pixel electrode 13. Side electrode 21 and open area (slit) 27 distort the electric field applied to the liquid crystal layer.

Then, in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. Then, when voltage over a threshold voltage, $V_{th}$, is applied, the time needed to stabilize the liquid crystal directors increases.

At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having high response time characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a conductive layer distorting electric field on the first substrate; a common-auxiliary electrode on a same layer whereon the conductive layer distorting-electric field is formed; a common electrode on the second substrate; a liquid crystal layer between the first and second substrates; and a storage electrode in an electric field inducing region that divides the liquid crystal layer into at least two domains.

The liquid crystal layer includes liquid crystal molecules having positive or negative dielectric anisotropy.

The multi-domain liquid crystal display device further comprises a negative uniaxial or negative biaxial film on at least one substrate.

The liquid crystal layer includes chiral dopants.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings:

FIGS. 2A, 2B, 2C, 2D, 2E, 2F, and 2G are plan views of the multi-domain liquid crystal display device according to the first embodiment of the present invention.

FIGS. 3A, 3B, 3C, 3D, 3E, 3F, and 3G are plan views of the multi-domain liquid crystal display device according to the second embodiment of the present invention.

DETAILED DESCRIPTION OF THE PREFERRED EMBODIMENTS

Hereinafter, the multi-domain liquid crystal display device of the present invention is explained in detail by accompanying the drawings.

Figure 1A:
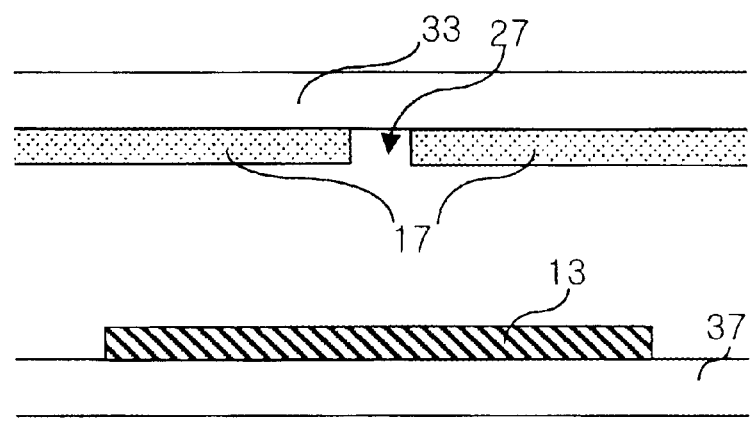
FIGS. 1A and 1B are sectional views of the liquid crystal display devices in the related art.
Figure 1B:
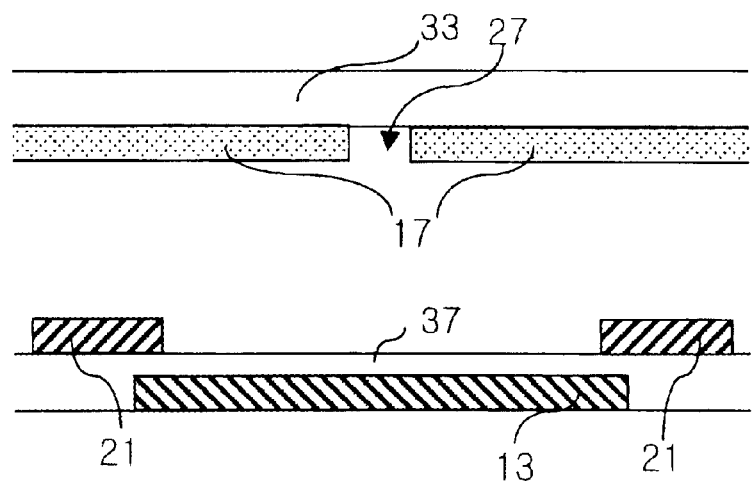
Figure 2B:
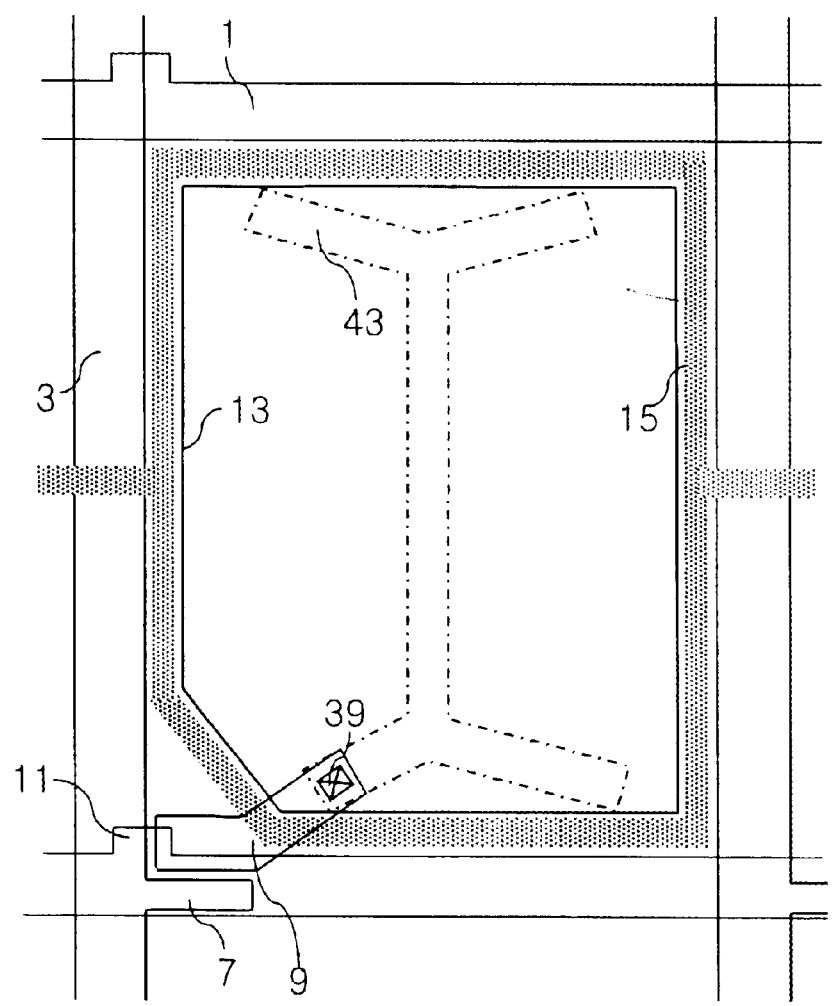
Figure 2C:
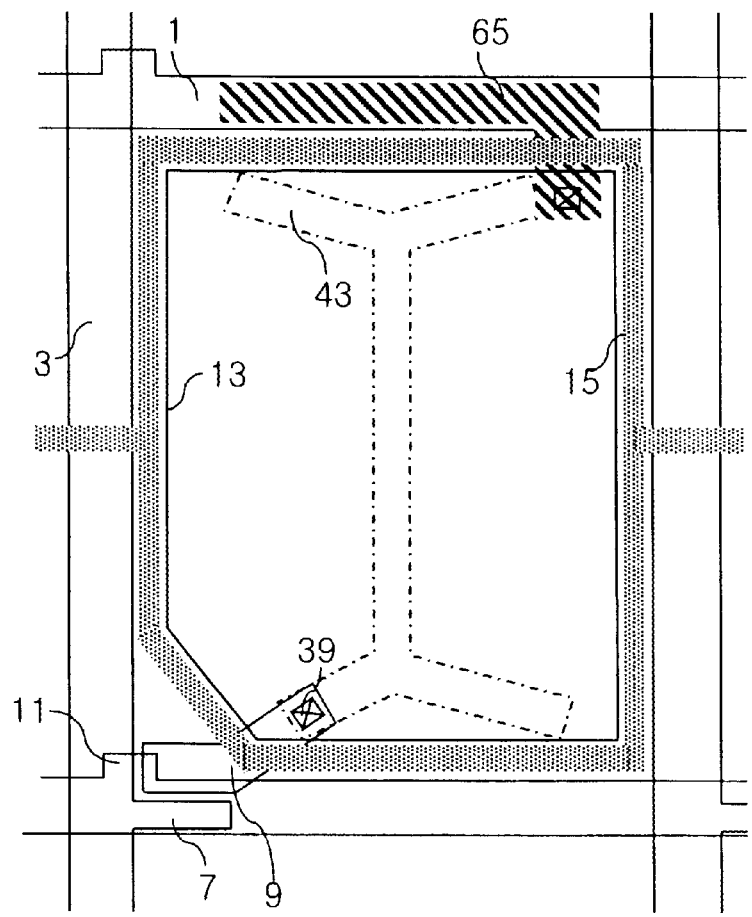
Figure 2D:
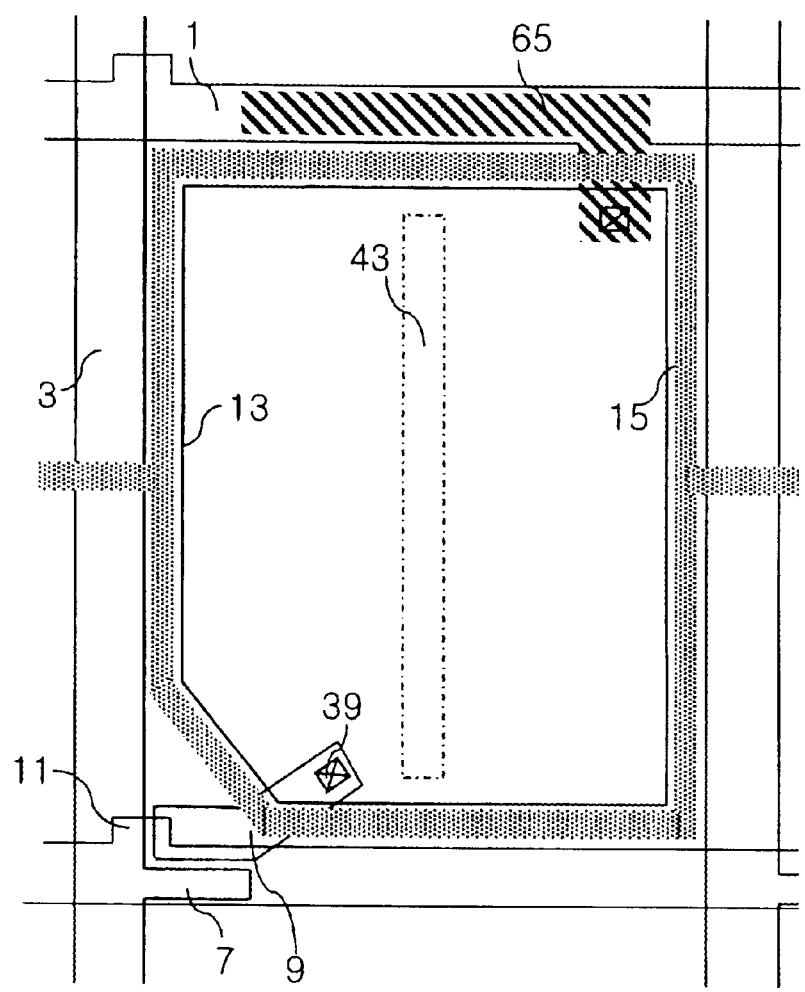
Figure 2E:
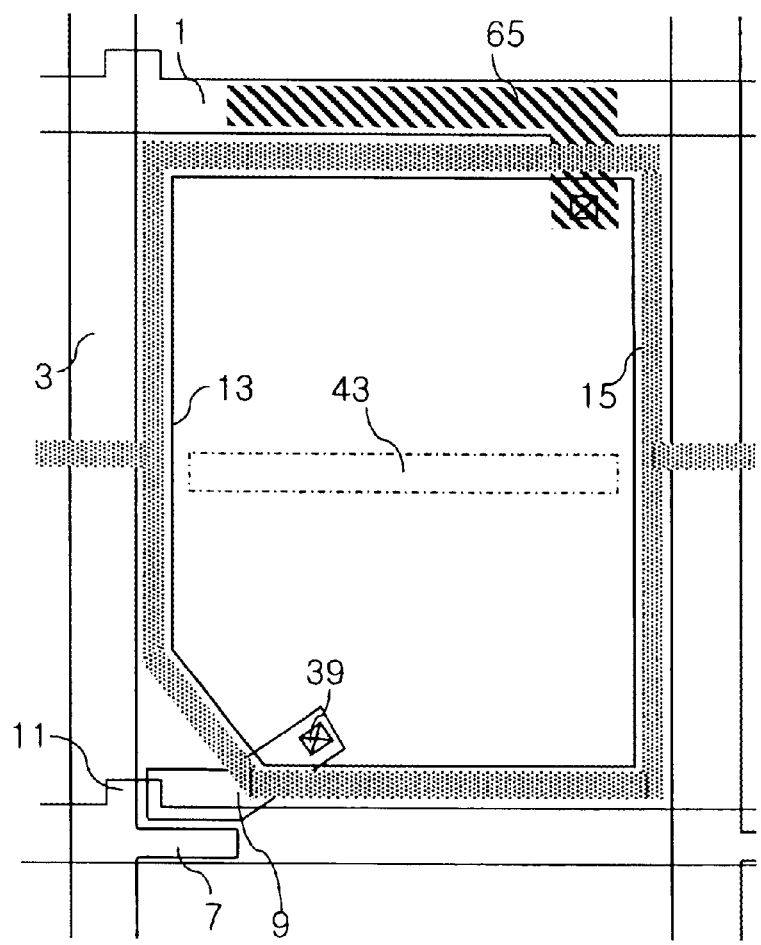
Figure 2F:
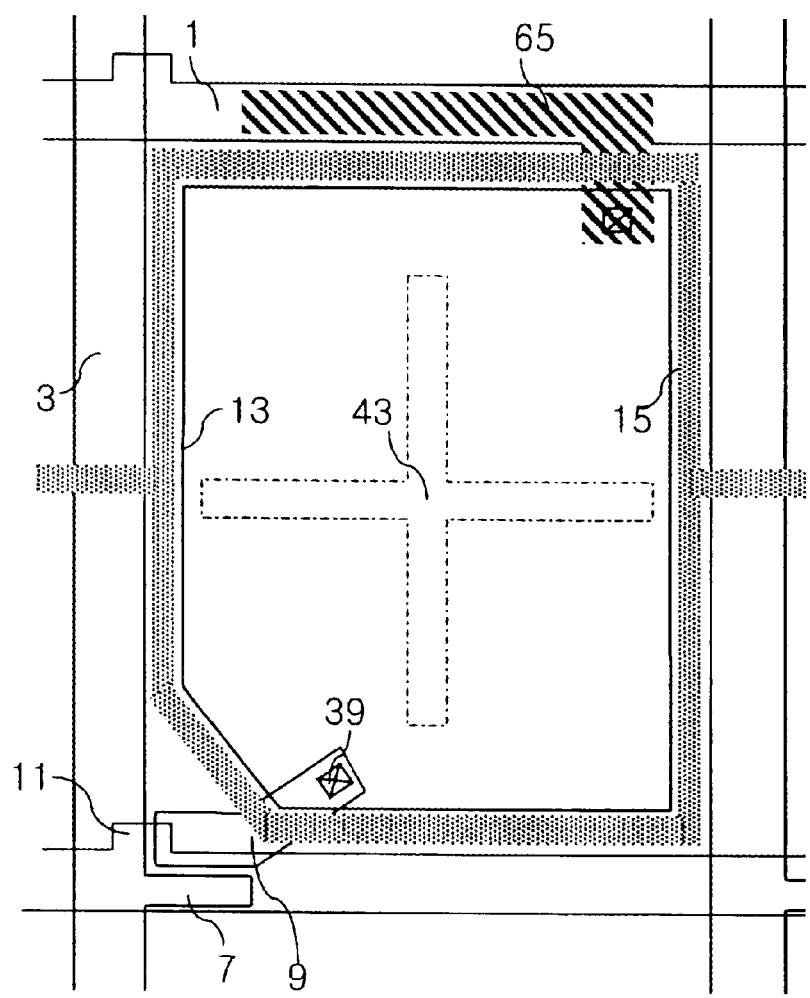
Figure 2G:
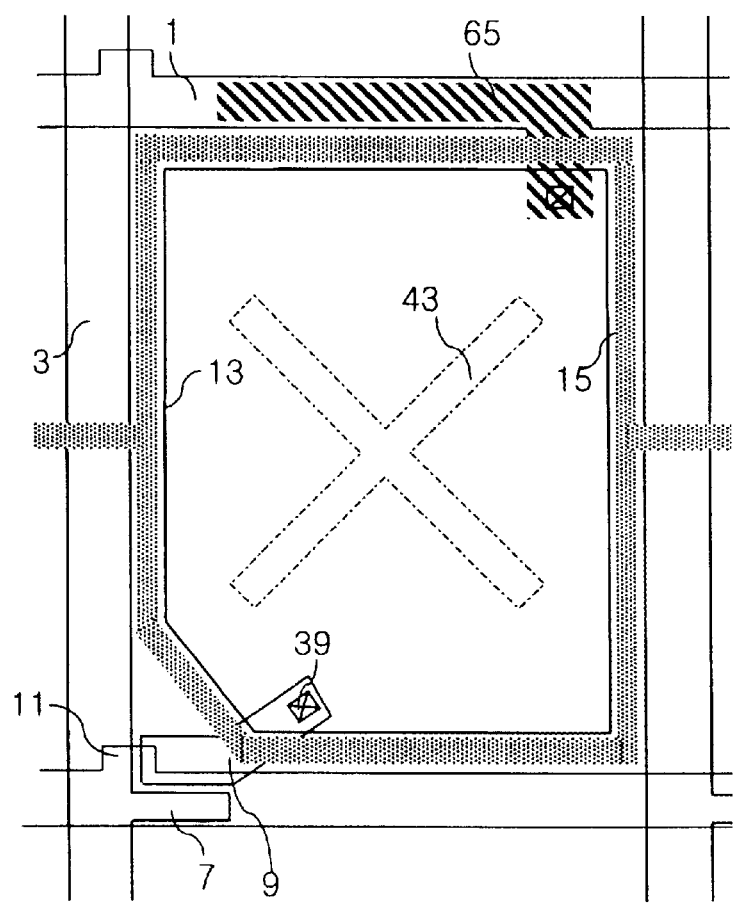
Figure 2H:
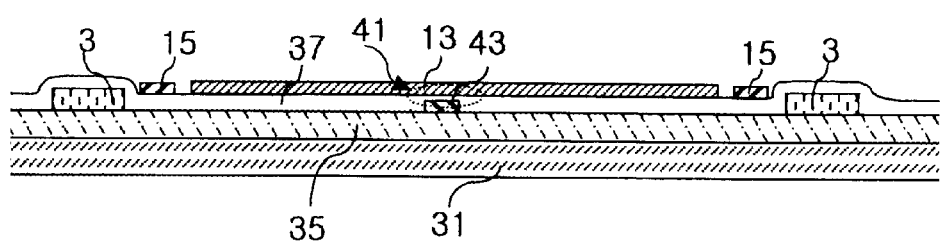
FIGS. 2H, 2I, and 2J, 2K are sectional views taken along the lines I–I' of FIG. 2A.
Figure 2I:
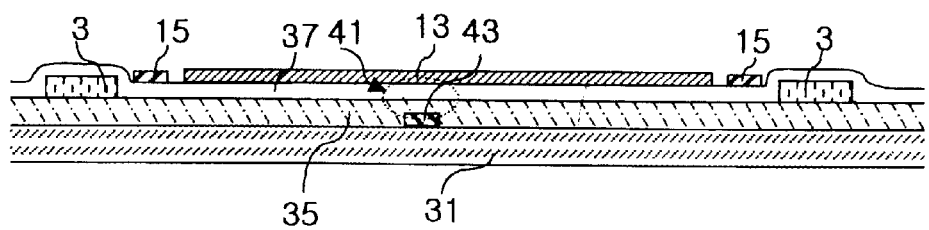
Figure 2J:
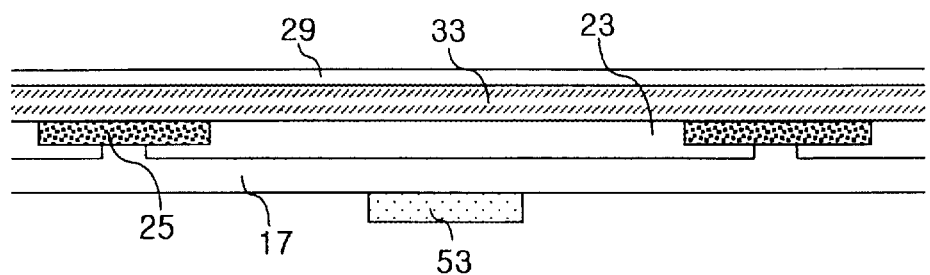
Figure 2J:
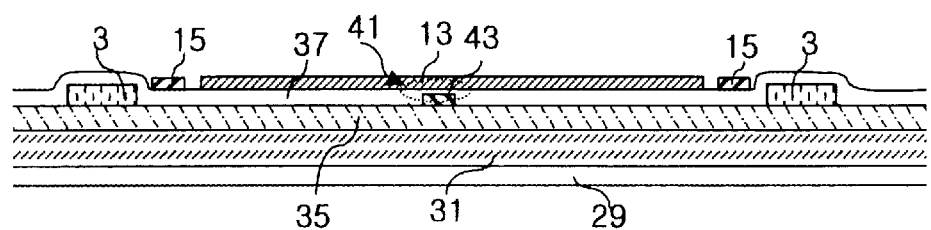
Figure 2K:
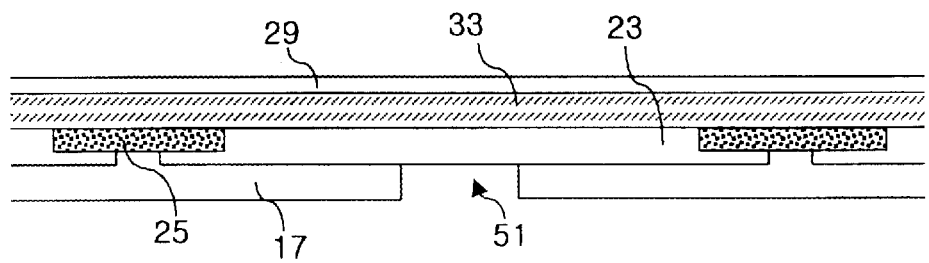
Figure 2K:
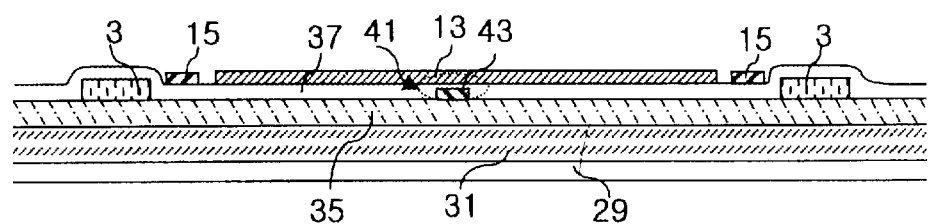

FIGS. 2A, 2B, 2C, 2D, 2E, 2F, and 2G are plan views of the multi-domain liquid crystal display device according to the first embodiment of the present invention, FIGS. 2H, 2I are sectional views taken along the lines I–I' of FIG. 2A, and FIGS. 2J, 2K are entire sectional views according to the FIG. 2H.

As shown in the figures, the present invention comprises first and second substrates 31, 33, a plurality of gate bus lines 1 arranged in a first direction on the first substrate and a plurality of data bus lines 3 arranged in a second direction on the first substrate, a TFT, a passivation layer 37, a pixel electrode 13, and a common-auxiliary electrode 15.

Data bus lines 3 and gate bus lines 1 divide the first substrate 31 into a plurality of pixel regions. The common-auxiliary electrode 15 distorts electric field on a same layer whereon the pixel electrode 13 is formed. The TFT is formed on each pixel region and comprises a gate electrode 11, a gate insulator 35, a semiconductor layer, an ohmic contact layer, and source/drain electrodes 7, 9.

Passivation layer 37 is formed on the whole first substrate 31. Pixel electrode 13 is coupled to the drain electrode 9 by a contact hole 39.

On the second substrate 33, a light shielding layer 25 is formed to shield the light leaked from gate and data bus lines 1, 3, and the TFT, a color filter layer 23 is formed on the light shielding layer 25, a common electrode 17 is formed on the color filter layer 23 and electrically connects to the common-auxiliary electrode 15, and a liquid crystal layer is formed between the first and second substrates 31, 33.

The common electrode 17 has dielectric frames 53 thereon, or has electric field inducing window 51 like hole or slit in its inner part.

In the first embodiment of the present invention, a first storage electrode 43 is formed on a same layer whereon the gate bus line is formed (refer to the FIG. 2I), or on a same layer whereon the source/drain electrodes 7, 9 are formed (refer to the FIG. 2H), and then the first storage electrode 43 forms a storage capacitor 41 with the pixel electrode 13. At this time, since the first storage electrode 43 is patterned as shown in the figures, the portions of disclination in the pixel region are covered.

Further, as shown in the FIG. 2C, a third storage electrode 65 is additionally formed to enlarge the capacitance of liquid crystal display device on the gate bus line 1, so that a image flicker or a residual image could be removed.

In the FIGS. 2D, 2E, 2F, and 2G, the first storage electrode 43 are patterned horizontally, vertically, and/or diagonally, or in a shape of "+" or "x", and in these embodiments, the dielectric frame 53 or electric field inducing window 51 on the second substrate is patterned as above.

In the FIGS. 2J and 2K, the common electrode 17 has dielectric frames 53 thereon, and has electric field inducing window 51 like hole or slit therein.

Figure 3A:
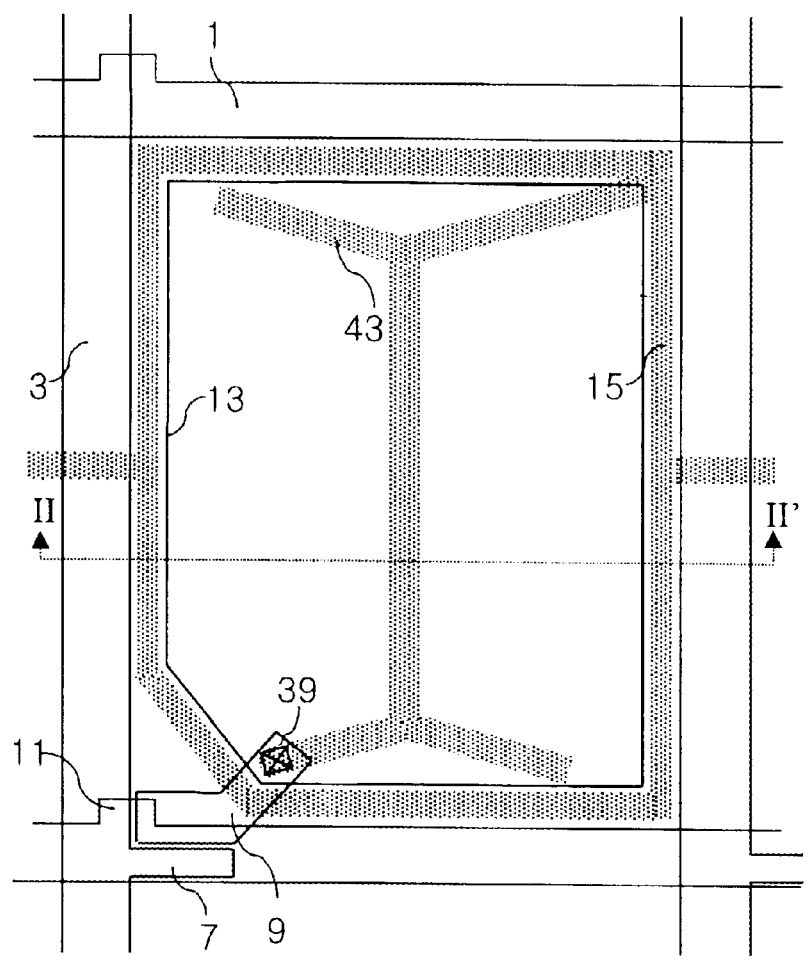
Figure 3B:
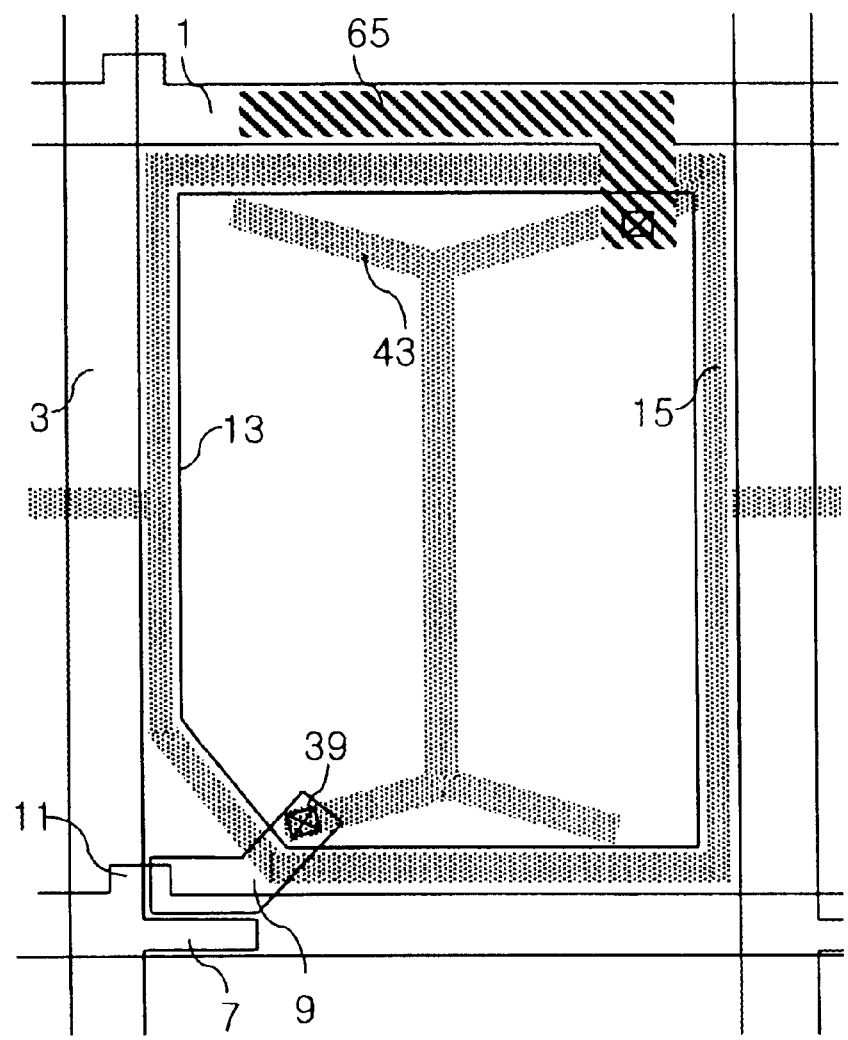
Figure 3D:
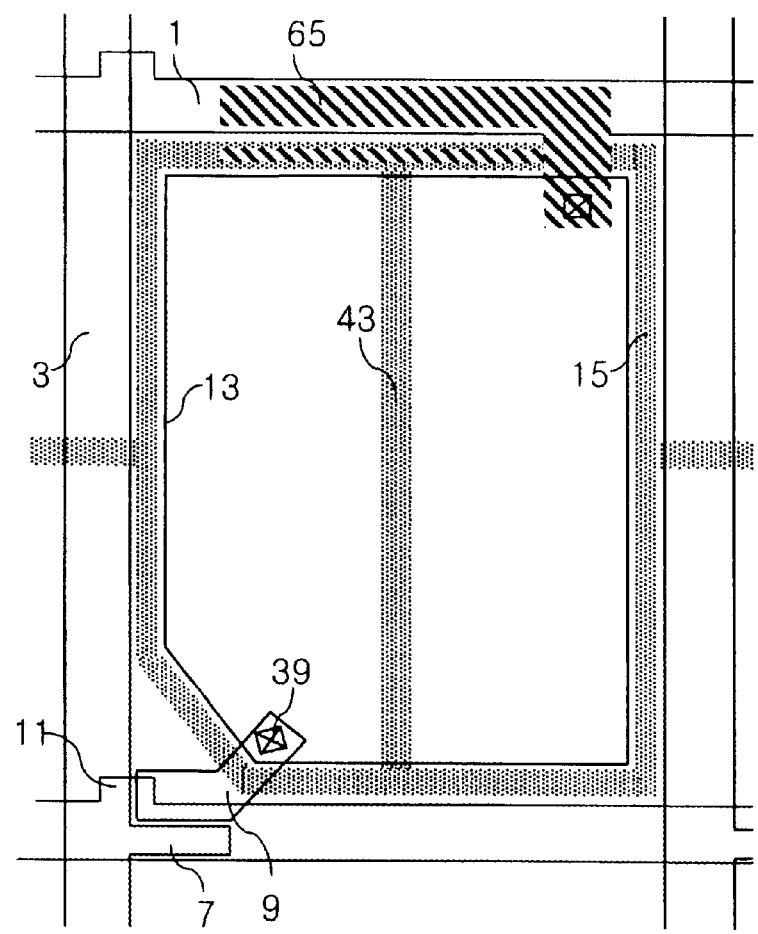
Figure 3F:
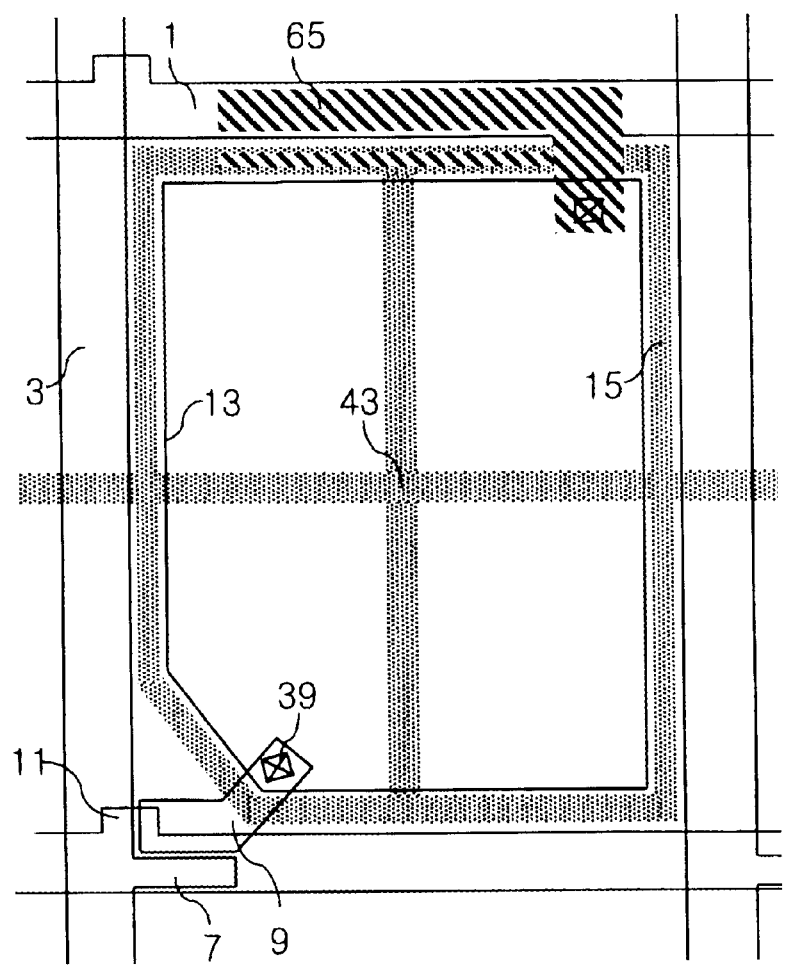
Figure 3G:
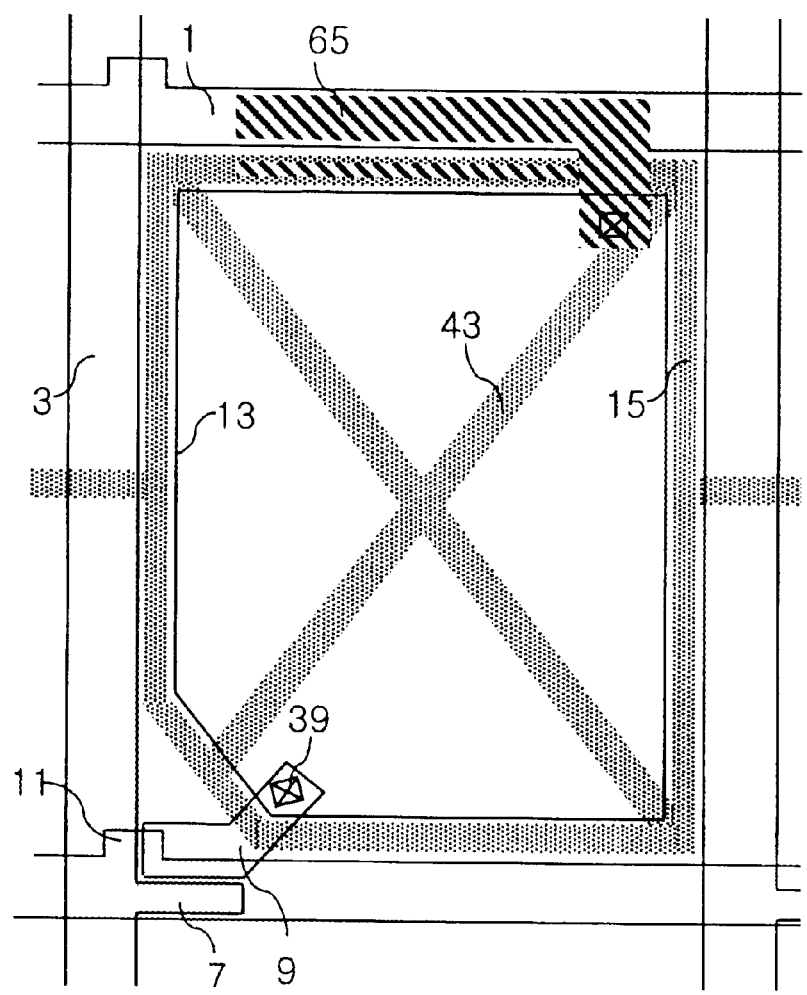
Figure 3H:
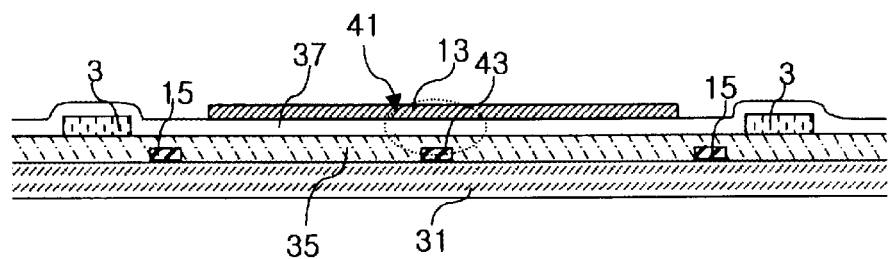
FIGS. 3H, and 3I, 3J are sectional views taken along the lines II–II' of FIG. 3A.
Figure 3I:
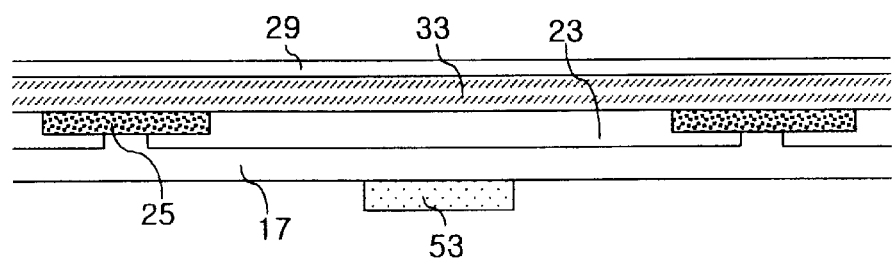
Figure 3I:
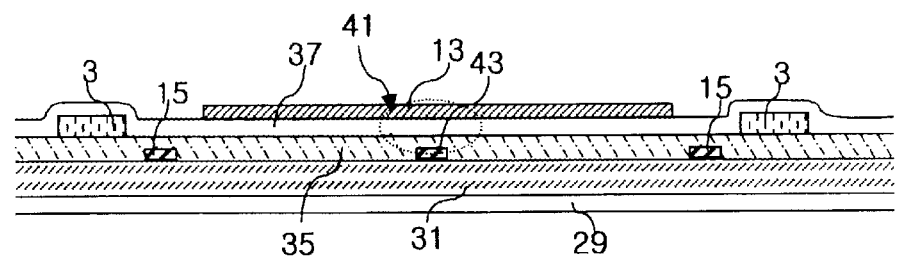
Figure 3J:
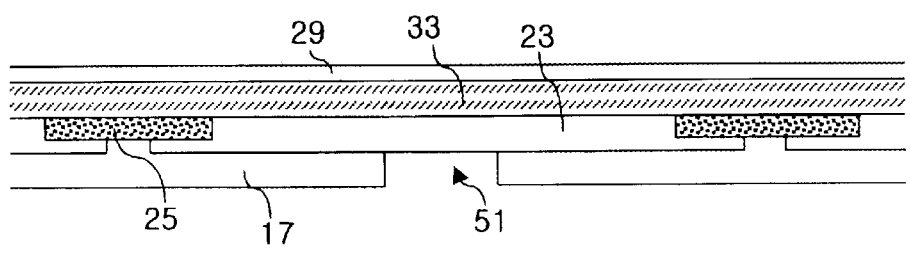
Figure 3J:
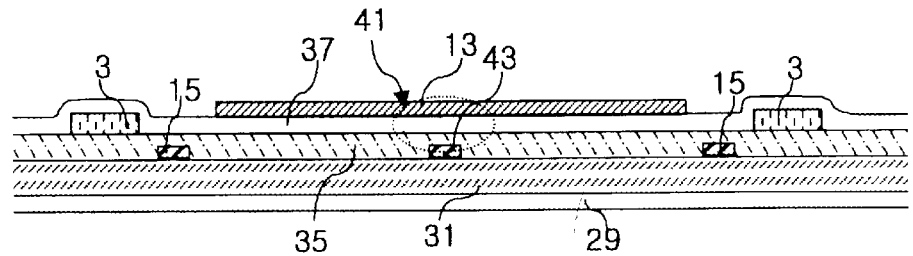

FIGS. 3A, 3B, 3C, 3D, 3E, 3F, and 3G are plan views of the multi-domain liquid crystal display device according to the second embodiment of the present invention, FIG. 3H is sectional view taken along the lines II–II' of FIG. 3A, and FIGS. 3I, 3J are entire sectional views according to the FIG. 3H.

As shown in the figures, the present invention comprises first and second substrates 31, 33, a plurality of gate bus lines 1 arranged in a first direction on the first substrate 31 and a plurality of data bus lines 3 arranged in a second direction on the first substrate 31, a common-auxiliary electrode 15, a first storage electrode 43, a TFT, a passivation layer 37, and a pixel electrode 13.

Data bus lines 3 and gate bus lines 1 divide the first substrate 31 into a plurality of pixel regions. The first storage electrode 43 is in the pixel region and on a same layer whereon the gate bus line 1 is formed, and is connected to or independently formed with the common-auxiliary electrode 15 to make a storage capacitor with the pixel electrode 13.

The common-auxiliary electrode 15 surrounds the pixel region and distorts electric field on a same layer whereon the gate bus line is formed.

The TFT is formed on each pixel region and comprises a gate electrode 11, a gate insulator 35, a semiconductor layer, an ohmic contact layer, and source/drain electrodes 7, 9. Passivation layer 37 is formed on the whole first substrate 31. Pixel electrode 13 is coupled to the drain electrode 9 by a contact hole 39.

On the second substrate 33, a light shielding layer 25 is formed to shield the light leaked from gate and data bus lines 1, 3, and the TFT, a color filter layer 23 is formed on the light shielding layer 25, a common electrode 17 is formed on the color filter layer 23 and electrically connects to the common-auxiliary electrode 15, and a liquid crystal layer is formed between the first and second substrates 31, 33.

The common electrode 17 has dielectric frames 53 thereon, or has electric field inducing window 51 like hole or slit in its inner part.

Further, as shown in the FIG. 3B, a third storage electrode 65 is additionally formed to enlarge the capacitance of liquid crystal display device on the gate bus line 1, so that a image flicker or a residual image could be removed.

In the FIG. 3C, all ends of the first storage electrode 43 are connected to the common-auxiliary electrode 15 and the third storage electrode 65 is formed on the common-auxiliary electrode 15 as well as the gate bus line 1, which obtains more enlarged capacitance than that in the embodiment in the FIG. 3B.

In the FIGS. 3D, 3E, 3F, and 3G, the first storage electrode 43 are patterned horizontally, vertically, and/or diagonally, or in a shape of "+" or "x", and in these embodiments, the dielectric frame 53 or electric field inducing window 51 on the second substrate is patterned as above. At this time, since the first storage electrode 43 is patterned as shown in the figures, the portions of disclination in the pixel region are covered.

In the FIGS. 3I and 3J, the common electrode 17 has dielectric frames 53 thereon, and has electric field inducing window 51 like hole or slit therein.

Figure 4A:
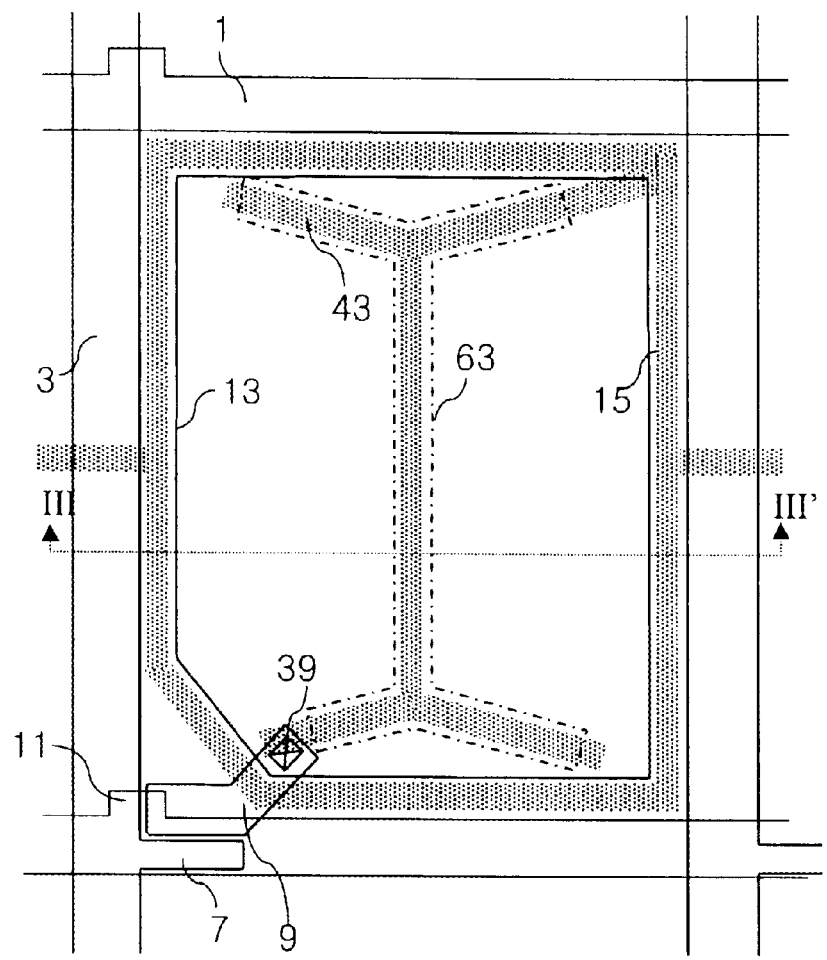
FIGS. 4A, 4B, 4C, 4D, 4E, 4F, and 4G are plan views of the multi-domain liquid crystal display devices according to the third embodiment of the present invention.
Figure 4B:
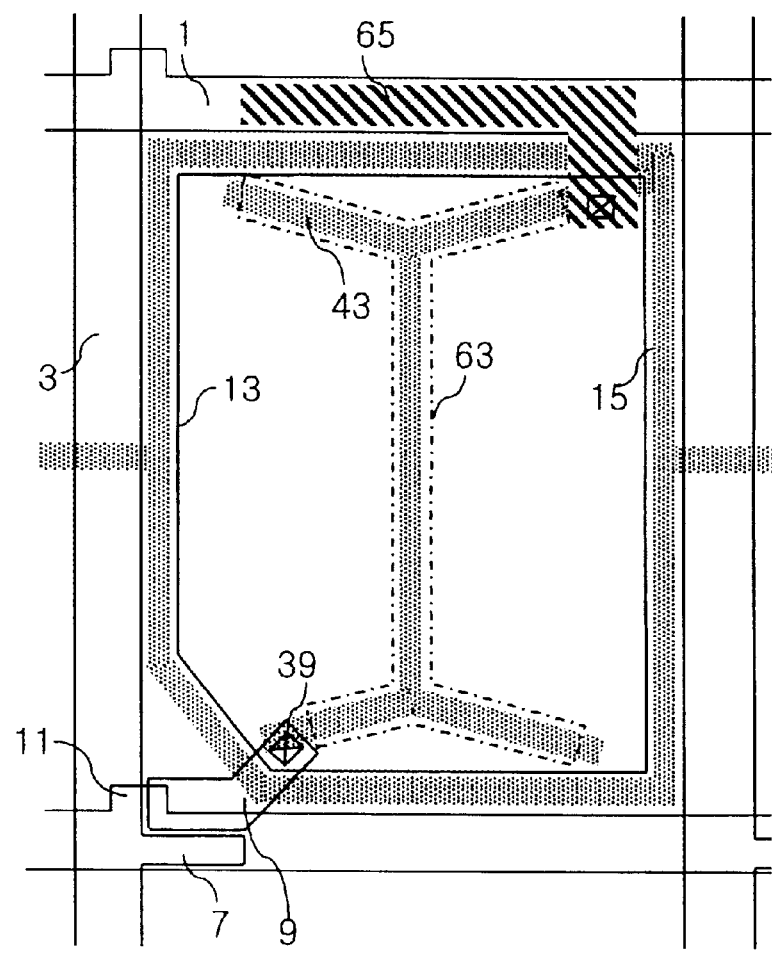
Figure 4C:
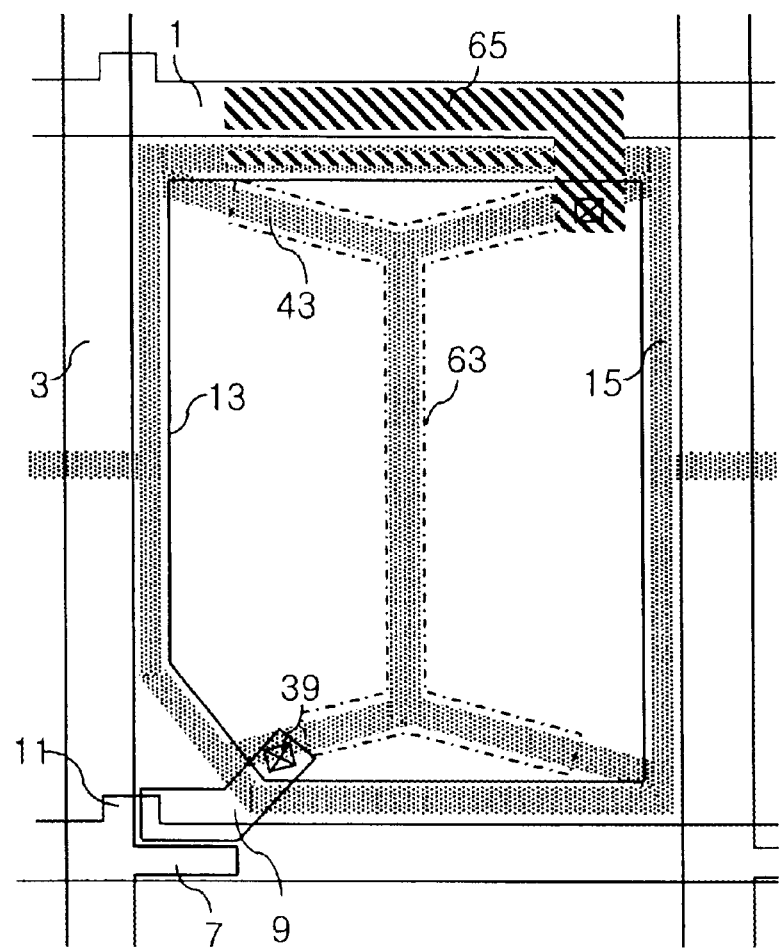
Figure 4D:
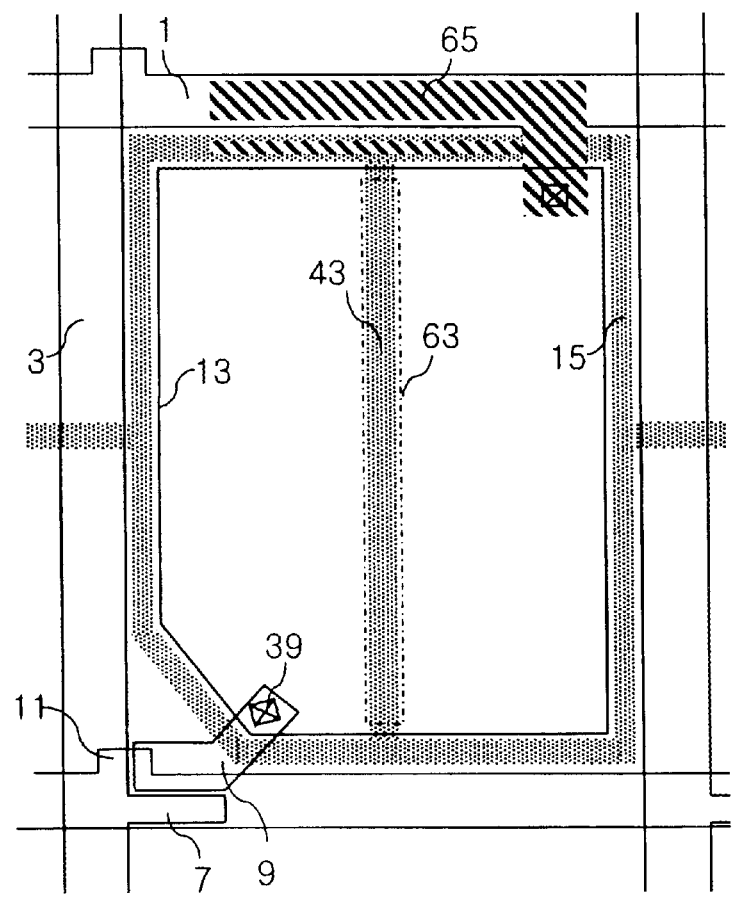
Figure 4E:
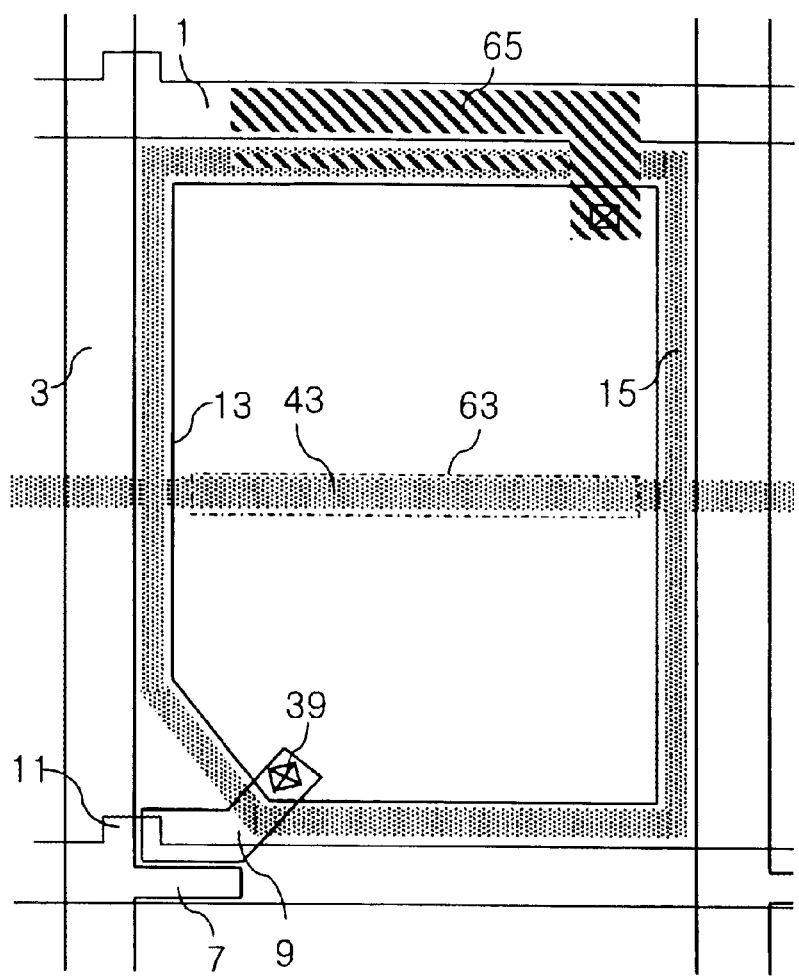
Figure 4F:
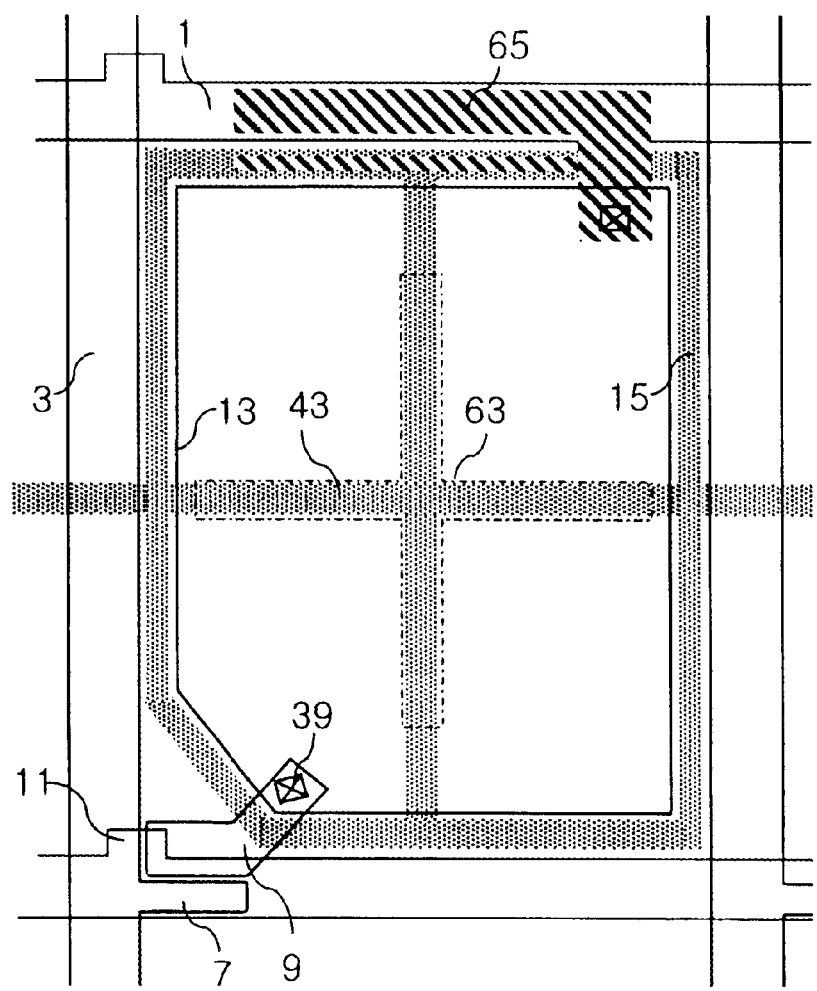
Figure 4G:
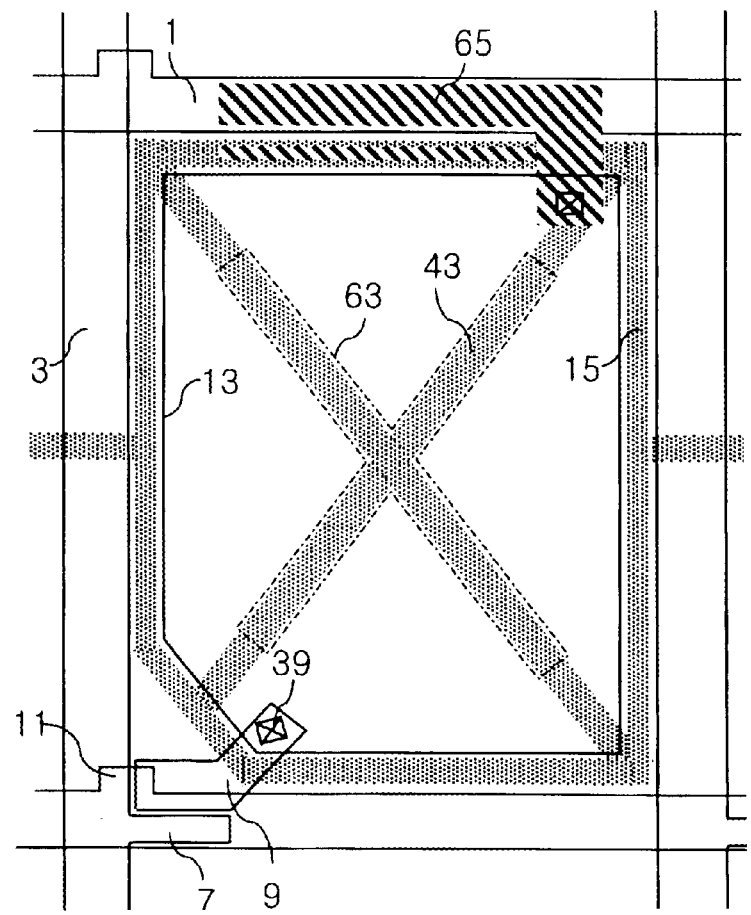
Figure 4H:
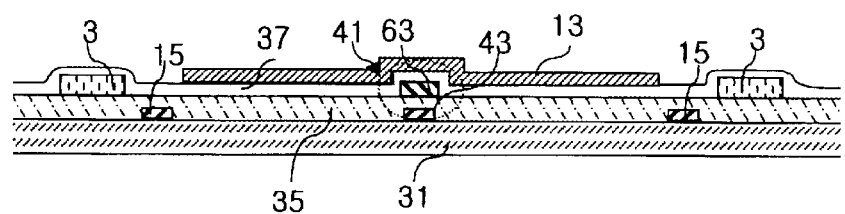
FIGS. 4H, and 4I, 4J are sectional views taken along the lines III–III' of FIG. 4A.
Figure 4I:
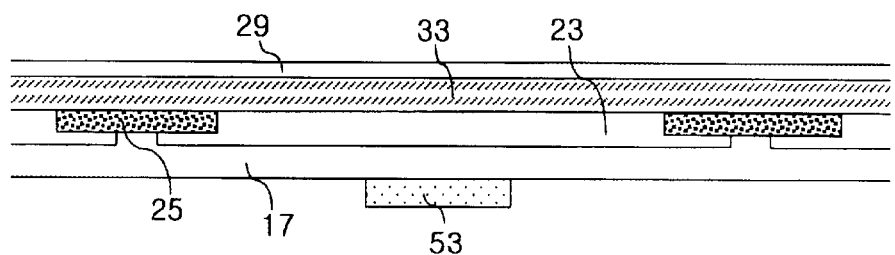
Figure 4I:
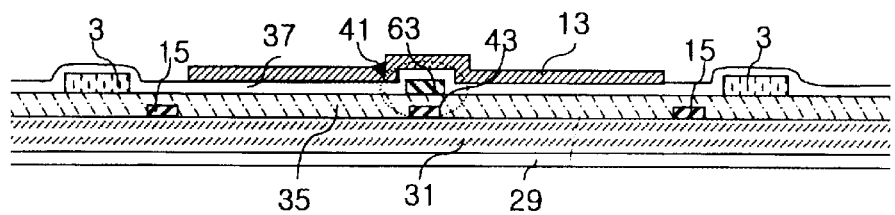
Figure 4J:
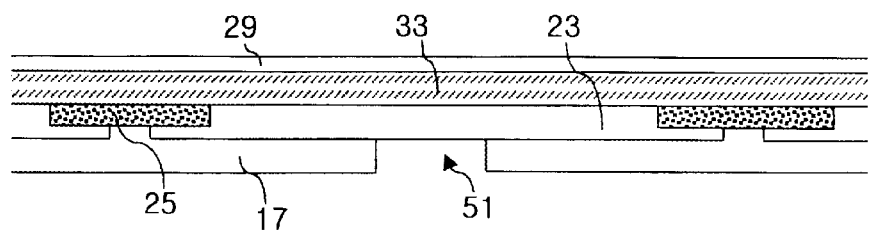
Figure 4J:
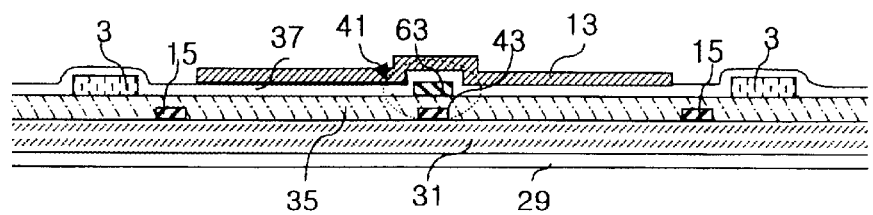
Figure 5A:
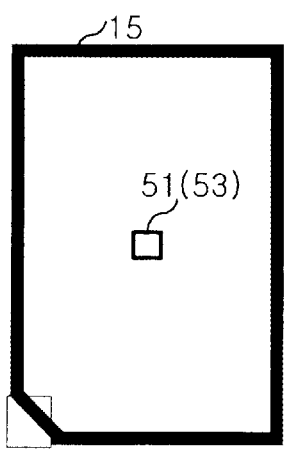
FIGS. 5A, 5B, 5C, 5D, 5E, 5F, and 5G are plan views of the multi-domain liquid crystal display devices showing various electric field inducing window or dielectric frame according to the embodiments of the present invention.
Figure 5B:
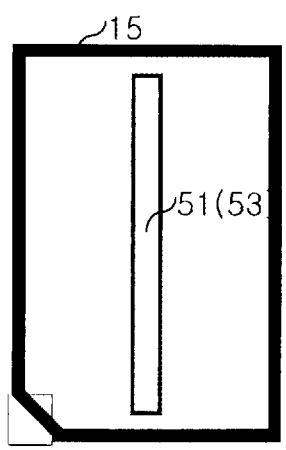
Figure 5C:
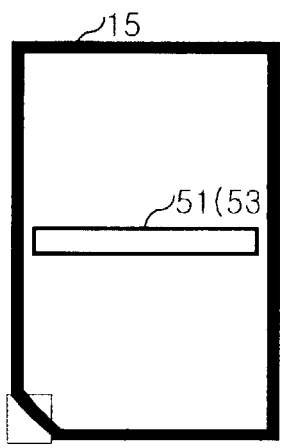
Figure 5D:
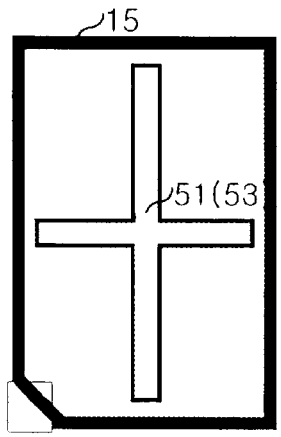
Figure 5E:
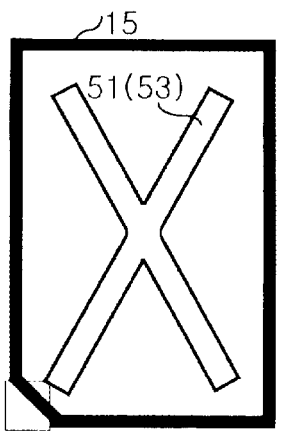
Figure 5F:
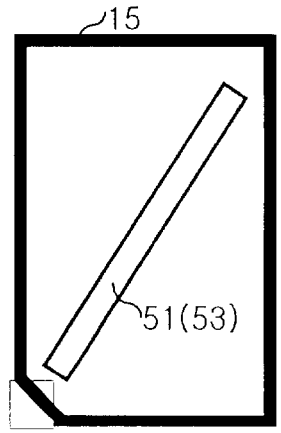
Figure 5G:
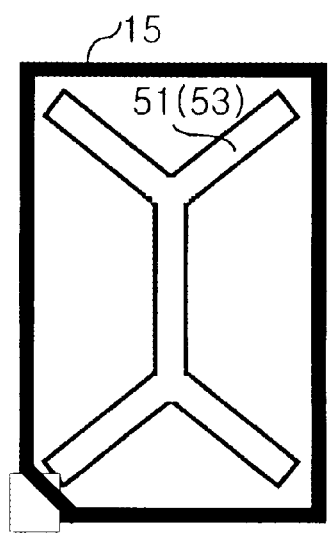

FIGS. 4A, 4B, 4C, 4D, 4E, 4F, and 4G are plan views of the multi-domain liquid crystal display device according to the second embodiment of the present invention, FIG. 4H is sectional view taken along the lines III–III' of FIG. 4A, and FIGS. 4I, 4J are entire sectional views according to the FIG. 4H.

In the third embodiment, a second storage electrode 63 is additionally formed on a same layer whereon the data bus line 3 is formed to the structure in the second embodiment. The second storage electrode 63 is formed at a time when the source/drain electrodes 7, 9 are formed and have a shape like the first storage electrode 43 in the pixel region.

When the second storage electrode 63 is connected to the drain electrode 9, the same voltage with the pixel electrode is applied to the second storage electrode, and then the second storage electrode forms a storage capacitor with the first storage electrode 43 related to the common-auxiliary electrode 15. When the second storage electrode 63 is independently formed, this forms a storage capacitor with the pixel electrode 13 and the first storage electrode 43.

Further, as shown in the FIG. 4B, a third storage electrode 65 is additionally formed to enlarge the capacitance of liquid crystal display device on the gate bus line 1, so that a image flicker or a residual image could be removed.

In the FIG. 4C, all ends of the first storage electrode 43 are connected to the common-auxiliary electrode 15 and the third storage electrode 65 is formed on the common-auxiliary electrode 15 as well as the gate bus line 1, which obtains more enlarged capacitance than that in the embodiment in the FIG. 4B.

In the FIGS. 4D, 4E, 4F, and 4G, the first storage electrode 43 are patterned horizontally, vertically, and/or diagonally, or in a shape of "+" or "x", and in these embodiments, the dielectric frame 53 or electric field inducing window 51 on the second substrate is patterned also as above. At this time, since the first storage electrode 43 is patterned as shown in the figures, the portions of disclination in the pixel region are covered.

In the FIGS. 4I and 4J, the common electrode 17 has dielectric frames 53 thereon, and has electric field inducing window 51 like hole or slit therein.

To manufacture the multi-domain LCD of the present invention, in each pixel region on the first substrate 31, a TFT is formed comprising gate electrode 11, gate insulator 35, semiconductor layer, ohmic contact layer and source/drain electrodes 7, 9. At this time, a plurality of gate bus lines 1 and a plurality of data bus lines 3 are formed to divide the first substrate 31 into a plurality of pixel regions.

Gate electrode 11 and gate bus line 1 are formed by sputtering and patterning a metal such as Al, Mo, Cr, Ta, or Al alloy, etc. Alternatively, it is possible to form the gate electrode and gate bus line as a double layer, the double layer is formed from different materials.

At this time, common-auxiliary electrode 15 is formed surrounding the pixel region. And, the first storage electrode 43 is formed by sputtering and patterning a metal such as ITO, Al, or Cr in the pixel region. The gate insulator 35 is formed by depositing $SiN_x$, $SiO_x$, or BCB (BenzoCycloButene), acrylic resin using PECVD thereon.

The semiconductor layer and the ohmic contact layer are formed by depositing with PECVD (Plasma Enhanced Chemical Vapor Deposition), and patterning amorphous silicon (a-Si) and doped amorphous silicon ($n^+$ a-Si), respectively. Also, gate insulator 35, amorphous silicon (a-Si), and doped amorphous silicon ($n^+$ a-Si) could be formed by PECVD and patterned simultaneously.

Data bus line 3 and source/drain electrodes 7, 9 are formed by sputtering and patterning a metal such as Al, Mo, Cr, Ta, or Al alloy, etc. Alternatively, it is possible to form the data bus line and source/drain electrodes as a double layer, the double layer is formed from different materials.

At this time, a storage electrode is additionally formed in the pixel region, on the gate bus line 1 and/or common-auxiliary electrode 15 at the same time, the storage electrode makes a storage capacitor with gate bus line 1 and/or common-auxiliary electrode 15.

Subsequently, passivation layer 37 is formed with BCB (BenzoCycloButene), acrylic resin, polyimide based material, $SiN_x$ or $SiO_x$ on the whole first substrate 31. Pixel electrode 13 is formed by sputtering and patterning a metal such as ITO(indium tin oxide). A contact hole 39 is formed to connect the pixel electrode 13 to the drain and storage electrodes by opening and patterning a part of the passivation layer 37 on the drain electrode.

When common-auxiliary electrode 15, and gate bus line 1 or pixel electrode 13 are formed with the same material, the common-auxiliary and gate electrodes are simultaneously formed with one mask and connected electrically to common electrode 17, or it is possible to form them with different materials or double layer with additional masks.

On the second substrate 33, a light shielding layer 25 is formed to shield any light leakage from gate and data bus lines 1, 3, the TFT, and common-auxiliary electrode 15. A color filter layer 23 is formed R, G, B (red, green, blue) elements to alternate on the light shielding layer 25.

A common electrode 17 is formed with ITO on the color filter layer 23, and a liquid crystal layer is formed by injecting liquid crystal between the first and second substrates 31, 33. The liquid crystal layer may include liquid crystal molecules having positive or negative dielectric anisotropy. Also, the liquid crystal layer may include chiral dopants.

On the common electrode 17, dielectric frames 53 are formed by depositing photosensitive material and patterning in various shapes using photolithography. The dielectric frame 53 includes material of which dielectric constant is same or smaller than that of the liquid crystal, and the dielectric constant thereof is preferably below 3, for example, photoacrylate or BCB (BenzoCycloButene).

Furthermore, the dielectric frame 53 is formed on at least one substrate between the first and second substrates.

Alternatively, an electric field inducing window 51 is formed on at least one substrate between the first and second substrates 31, 33. At this time, the dielectric frame 53 and electric field inducing window are formed on same substrate together. The electric field inducing window 51 is formed by patterning hole or slit in the common electrode 17 or pixel electrode 13.

To apply voltage ($V_{com}$) to common-auxiliary electrode 15, Ag-dotting part is formed in each corner of driving area on the first substrate 31, electric field is applied with the second substrate 33, and the liquid crystal molecules are driven by the potential difference. A voltage ($V_{com}$) is applied to common-auxiliary electrode 15 by connecting the Ag-dotting part to the common-auxiliary electrode 15, which is accomplished simultaneously by forming the common-auxiliary electrode 15.

On at least one substrate, a compensation film 29 is formed with polymer. The compensation film 29 is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, polarizer is formed on at least one substrate. At this time, the polarization axis of the polarizer is 45°, 135° against the alignment axis of the liquid crystal molecules, and the compensation film and polarizer are preferably composed as one. Also, it is possible to form that the optic axis of the compensation film and the polarization axis of the polarizer are parallel.

In the multi-domain LCD of the present invention, the aperture ratio is enhanced by an optimum structure design of a "n-line" thin film transistor (U.S. Pat. No. 5,694,185) so as to reduce power consumption, increase luminance, and lower reflection, thus improving contrast ratio.

Aperture ratio is increased by forming the TFT above the gate line and providing a "n-line" TFT. The parasitic capacitor, occurring between the gate bus line and the drain electrode, can be reduced when a TFT having the same channel length as the symmetrical TFT structure is manufactured due to effect of channel length extension.

FIGS. 5A, 5B, 5C, 5D, 5E, 5F, and 5G are plan views of the multi-domain liquid crystal display devices showing various electric field inducing window or dielectric frame according to the embodiments of the present invention.

The multi-domain LCD of the present invention has a dielectric frame 53 on the pixel electrode 13, common electrode, and/or color filter layer 23, or an electric field inducing window 51 like a hole or slit in the pixel electrode 13, passivation layer 37, gate insulator 35, color filter layer 23, and/or common electrode by patterning, thereby electric field distortion effect and multi-domain are obtained.

That is, from forming electric field inducing window 51 or dielectric frame 53, the multi-domain is obtained by dividing each pixel into four domains such as in a "+", "x", or "double Y" shape, or dividing each pixel horizontally, vertically, and/or diagonally, and differently alignment-treating or forming alignment directions on each domain and on each substrate.

In multi-domain LCD of the present invention, an alignment layer(not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used.

Irradiating light once on the alignment layer determines the alignment or pretilt direction and the pretilt angle.

The light used in the photo-alignment is preferably a light in a range of ultraviolet light, and any of unpolarized light, linearly polarized light, and partially polarized light can be used.

In the photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, since the multi-domain LCD of the present invention forms the common-auxiliary electrode surrounding the pixel region and the storage electrode on a same layer whereon the gate bus line and/or the data bus line in the pixel region, it improves the aperture ratio and storage capacitor, which obtains wide viewing angle and multi-domain effect.

Moreover, when the common-auxiliary electrode is on a same layer with the gate bus line, the short between the pixel and common-auxiliary electrodes is removed, and then the yield is improved.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:
    first and second substrates facing each other;
    a conductive layer distorting electric field on said first substrate;
    a common-auxiliary electrode on a same layer whereon said conductive layer distorting electric field is formed;
    a common electrode on said second substrate;
    a liquid crystal layer between said first and second substrates; and
    a storage electrode in an electric field inducing region that divides said liquid crystal layer into at least two domains.

2. The multi-domain liquid crystal display device according to claim 1, wherein said conductive layer distorting electric field is source and drain electrodes.

3. The multi-domain liquid crystal display device according to claim 2, wherein said source and drain electrodes are formed on a same layer whereon said storage electrode is formed.

4. The multi-domain liquid crystal display device according to claim 1, wherein said storage electrode is a light shielding layer.

5. The multi-domain liquid crystal display device according to claim 1, wherein said electric field inducing region is an electric field inducing window in said common electrode.

6. The multi-domain liquid crystal display device according to claim 1, wherein said electric field inducing region is a dielectric frame on said common electrode.

7. The multi-domain liquid crystal display device according to claim 1, wherein said common-auxiliary electrode includes a material selected from the group consisting of ITO (indium tin oxide), aluminum, molybdenum, chromium, tantalum, titanium, and an alloy thereof.

8. The multi-domain liquid crystal display device according to claim 1, wherein said common electrode includes ITO (indium tin oxide).

9. The multi-domain liquid crystal display device according to claim 1, further comprising:
    an alignment layer on at least one substrate between said first and second substrates.

10. The multi-domain liquid crystal display device according to claim 9, wherein said alignment layer is divided into at least two portions, liquid crystal molecules in said liquid crystal layer in each portion being aligned differently from each other.

11. The multi-domain liquid crystal display device according to claim 10, wherein at least one portion of said the alignment layer is alignment-treated.

12. The multi-domain liquid crystal display device according to claim 10, wherein all portions of said the alignment layer are non-alignment-treated.

13. The multi-domain liquid crystal display device according to claim 1, wherein said liquid crystal layer includes liquid crystal molecules having positive dielectric anisotropy.

14. The multi-domain liquid crystal display device according to claim 1, wherein said liquid crystal layer includes liquid crystal molecules having negative dielectric anisotropy.

15. The multi-domain liquid crystal display device according to claim 1, further comprising:
a negative uniaxial film on at least one substrate between said first and second substrates.

16. The multi-domain liquid crystal display device according to claim 1, further comprising:
a negative biaxial film on at least one substrate between said first and second substrates.

17. The multi-domain liquid crystal display device according to claim 1, wherein said liquid crystal layer includes chiral dopants.

18. A multi-domain liquid crystal display device comprising:
first and second substrates facing each other;
a pixel electrode on said first substrate;
a common-auxiliary electrode on a same layer whereon said pixel electrode is formed;
a common electrode on said second substrate;
a liquid crystal layer between said first and second substrates; and
a storage electrode in an electric field inducing region that divides said liquid crystal layer into at least two domains.

19. The multi-domain liquid crystal display device according to claim 18, wherein said pixel electrode is on said storage electrode.

20. The multi-domain liquid crystal display device according to claim 18, wherein said storage electrode is a light shielding layer.

21. The multi-domain liquid crystal display device according to claim 18, further comprising:
a supplementary storage electrode in a region other than a region where said pixel electrode is formed.

22. The multi-domain liquid crystal display device according to claim 18, wherein said electric field inducing region is an electric field inducing window in said common electrode.

23. The multi-domain liquid crystal display device according to claim 18, wherein said electric field inducing region is a dielectric frame on said common electrode.

24. The multi-domain liquid crystal display device according to claim 18, wherein said electric field inducing region is an electric field inducing window in said pixel electrode.

25. The multi-domain liquid crystal display device according to claim 18, wherein said electric field inducing region is a dielectric frame on said pixel electrode.

26. The multi-domain liquid crystal display device according to claim 18, wherein said common-auxiliary electrode includes a material selected from the group consisting of ITO (indium tin oxide), aluminum, molybdenum, chromium, tantalum, titanium, and an alloy thereof.

27. The multi-domain liquid crystal display device according to claim 18, wherein said pixel electrode includes a material selected from the group consisting of ITO (indium tin oxide), aluminum, and chromium.

28. The multi-domain liquid crystal display device according to claim 18, wherein said common electrode includes ITO (indium tin oxide).

29. The multi-domain liquid crystal display device according to claim 18, further comprising:
an alignment layer on at least one substrate between said first and second substrates.

30. The multi-domain liquid crystal display device according to claim 29, wherein said alignment layer is divided into at least two portions, liquid crystal molecules in said liquid crystal layer in each portion being aligned differently from each other.

31. The multi-domain liquid crystal display device according to claim 30, wherein at least one portion of said the alignment layer is alignment-treated.

32. The multi-domain liquid crystal display device according to claim 30, wherein all portions of said t he alignment layer are non-alignment-treated.

33. The multi-domain liquid crystal display device according to claim 18, wherein said liquid crystal layer includes liquid crystal molecules having positive dielectric anisotropy.

34. The multi-domain liquid crystal display device according to claim 18, wherein said liquid crystal layer includes liquid crystal molecules having negative dielectric anisotropy.

35. The multi-domain liquid crystal display device according to claim 18, further comprising:
a negative uniaxial film on at least one substrate between said first and second substrates.

36. The multi-domain liquid crystal display device according to claim 18, further comprising:
a negative biaxial film on at least one substrate between said first and second substrates.

37. The multi-domain liquid crystal display device according to claim 18, wherein said liquid crystal layer includes chiral dopants.

* * * * *